(12) United States Patent
Grob et al.

(10) Patent No.: US 6,444,158 B1
(45) Date of Patent: Sep. 3, 2002

(54) HANDLED PLASTIC CONTAINER

(75) Inventors: Rolf Grob, Chadstone (AU); Suppayan M. Krishnakumar; Harry L. Ieuan, both of Nashua, NH (US); Thomas E. Nahill, Amherst, NH (US)

(73) Assignee: Continental PET Technologies, Inc., Toledo, OH (US)

( * ) Notice: Subject to any disclaimer, the term of this patent is extended or adjusted under 35 U.S.C. 154(b) by 0 days.

(21) Appl. No.: 09/180,613

(22) PCT Filed: May 14, 1997

(86) PCT No.: PCT/US97/09244

§ 371 (c)(1),
(2), (4) Date: Oct. 18, 1999

(87) PCT Pub. No.: WO97/43108

PCT Pub. Date: Nov. 20, 1997

(30) Foreign Application Priority Data

May 14, 1996 (AU) ............................................. PN9817

(51) Int. Cl.⁷ .......................... B29C 49/20; B29D 22/00
(52) U.S. Cl. ........................ 264/516; 215/396; 215/398
(58) Field of Search .......................... 264/516; 215/396, 215/398

(56) References Cited

U.S. PATENT DOCUMENTS

| | | | |
|---|---|---|---|
| 420,916 A | 2/1890 | McIntire | 220/759 |
| 2,073,475 A | 3/1937 | Gordon | 220/759 |
| 3,077,286 A | 2/1963 | Cornelius | 220/759 |
| 3,347,404 A | 10/1967 | McIntyre | 220/759 |
| 4,273,246 A | 6/1981 | Thompson | 215/398 |
| 4,368,826 A | 1/1983 | Thompson | 215/398 |
| 4,372,454 A | 2/1983 | Thompson | |
| 4,433,864 A | 2/1984 | Byrd | 220/759 |
| 4,952,133 A | 8/1990 | Hasegawa et al. | |
| 4,982,869 A | 1/1991 | Robbins, III | |
| 5,297,686 A | 3/1994 | Takeuchi | 215/398 |
| 5,338,503 A | 8/1994 | Yanagisawa et al. | |
| 5,447,259 A | 9/1995 | Erickson | 220/759 |
| 5,469,612 A | 11/1995 | Collette et al. | |
| 5,508,076 A | 4/1996 | Bright | |
| 5,560,506 A | 10/1996 | Yanagisawa et al. | 215/398 |

FOREIGN PATENT DOCUMENTS

| | | |
|---|---|---|
| JP | 4-168029 | 6/1992 |
| JP | 7-117104 | 5/1995 |
| WO | WO96/14975 | 5/1996 |

*Primary Examiner*—Suzanne E. McDowell
(74) *Attorney, Agent, or Firm*—Finnegan, Henderson, Farabow, Garrett & Dunner, LLP (57) ABSTRACT

Method of securing a separate handle (18) to a plastic blow-molded container, the container having a molded external flange which is not subject to stretching during the blow-molding process. The flange has a substantially flat underside face and serves as a rigid support for the handle (18) when a substantially flat upper abutment surface of the handle (18) is positioned against the flange. Preferably, the upper end of the handle (18) has a downwardly extending lug (15) which is surrounded by the blow-molded sidewall of the container. The preform and handle (18) can be brought together into position where the upper end of the handle is adjacent to the underside of the external flange by relative movement of the preform and handle (18) towards each other along a first path which is substantially perpendicular to the longitudinal axis of the preform. In addition, the handle (18) and preform can be brought together prior to their introduction into the mold, and then introduced together into the blow mold along a second path which is also substantially perpendicular to the longitudinal axis of the preform. Further, the preform can be heated prior to introduction into the mold, while the handle (18) remains unheated.

29 Claims, 10 Drawing Sheets

HANDLED PLASTIC CONTAINER

FIELD OF THE INVENTION

This invention relates to a handled plastic container in which the container is formed by blow molding a preform and the handle is separately formed and then connected to the container during the container forming process.

BACKGROUND OF THE INVENTION

Plastic containers for holding liquids including beverages and other domestic liquids are in wide spread use. During the 1980's plastic largely replaced glass as the material of first choice for the packaging of carbonated soft drinks. Plastics such as polyethylene terephthalate (PET) offer significant savings when compared with glass in packaging such products. Plastic is lighter than glass and plastic bottles are cheaper to make and cheaper to transport than glass bottles. In addition, there are clear safety advantages when using plastic given the inherent problems with breakages when using glass. Plastic containers are also in wide use for products such as detergents and fruit juices. Such products are generally packaged in one or two litre containers with relatively large outlet openings. For ease of pouring, containers such as those made from PVC often include a handle. In the past, the handle in plastic containers formed by extrusion blow molding has been provided by blow molding a hollow and integral handle portion into the container side wall.

Given the constraints of container design, such handles are generally quite broad and often leave little room for one to firmly grasp the inside of the handle. Special molds are required in the production of such bottles, they are more difficult to blow mold than a non handled bottle and there are difficulties with stress concentrations leading to possible container failure in the areas near the junction of the handle with the rest of the container. In addition, it has not been generally possible to economically produce such handled bottles from synthetic polyesters such as PET. To extrusion blow mold PET it would be necessary to use a resin having a high intrinsic viscosity, i.e. well over 1.0. Such containers would not have the same degree of side wall orientation as a container stretch blow molded from the preform.

If an integral handle was formed in a PET container formed from a preform, a special cutting tooling would be required to remove the flashing from between the container side wall and the integrally formed handle due to the high orientation of the material.

An alternative is the use of a separate handle joined to the container. If a separate handle is utilized, it is possible to injection mold a handle which is narrower and thinner than the integral handles of the previously described blow-molded containers, and if adequately attached to the container, such handle designs are more effective and easier to use.

Various attempts have been made to attach separate handles to blow molded containers formed from preforms but these have not been altogether successful. One difficulty has been inadequate engagement of the handle with the blow molded container. For example, it has previously been proposed that such handles be connected to the plastic container by blow molding the walls of the container around retaining portions provided at the respective ends of the handle. For example, reference is made to Australian patent 637,696. In processes where the handle is pre-engaged with the preform prior to positioning the combination into the blow mold, there are problems in automating the whole process. The need to interconnect the handle with the preform prior to introducing the combination into the blow mold complicates the manufacturing process and can slow it down. This is especially so if the interconnection process occurs in a different direction to the direction of insertion of the combination into the blow mold.

SUMMARY OF THE INVENTION

It is an object of the present invention to provide a method of securing a separate handle to a plastic blow molded container which enables relatively rapid manufacture and which leads to the production of a handled bottle where the handle is firmly secured.

In one embodiment, the invention utilises a molded external flange which is not subject to stretching during the blow molding process and which provides a rigid support, against which an upper end of the handle is held by a portion of the side wall of the container once the preform has been blown.

This embodiment thus achieves the desired object by positioning a preform and a handle into a blow mold and thereafter stretch blow molding the preform in such a way as to sandwich the upper end of the handle between a portion of the side wall of the formed container and a substantially flat underside of a molded external flange located on the neck of the preform. This simplifies the construction of the handle and preform, as well as simplifying the positioning of the preform and handle during blow molding to thus reduce the overall cost of manufacture, while providing a secure attachment.

More particularly, in accordance with one embodiment of the present invention there is provided a method of manufacturing a handled plastic container which includes the steps of:

(a) positioning in an open blow mould a synthetic plastics preform which includes an external flange with a substantially flat underside face, and a handle which includes an upper end with a substantially flat abutment surface;

(b) closing the blow mould and stretch blow moulding the preform beneath the flange to form a container, wherein a sidewall portion of the preform is expanded so as to sandwich the upper end of the handle between a portion of the sidewall of the formed container and the flange with the substantially flat upper abutment surface and underside face being pressed together so as to fixedly connect the handle to the blown container.

Preferably the preform and handle are brought together into position where the upper end of the handle is adjacent to the underside of the external flange by relative movement of the preform and the handle towards each other along a first path which is substantially perpendicular to a longitudinal axis of the preform.

Most preferably, the preform and handle are brought together into this position prior to their introduction into the blow mould. In such case, it is preferred that the handle and preform once brought together be introduced into the blow mould together along a second path which is also substantially perpendicular to the longitudinal axis of the preform. The first and second paths may conveniently be in the same plane so that the handle and preform may be brought together and conveyed into the open blow mould by movement along a path which has no abrupt changes in direction.

Generally, the method of the invention is used with blow moulding equipment which requires that the preform be pre-heated before introduction into the blow mould to a temperature at which it may be stretched and blow moulded (e.g., in the glass transition range). Therefore, generally the preform is hot and the handle is cold when the two are positioned in the mould.

It is preferred that the preform and the handle be unconnected when positioned in the open blow mould. However, in one embodiment of the invention further described below where the handle is attached to the container only at its upper end, it is preferred that the upper end of the handle be broad enough to clip around the preform immediately beneath the external flange.

Preferably, the upper end of the handle also includes retaining means such that upon expansion of the sidewall of the preform, the retaining means is caused to interconnect with a portion of the formed container. Most preferably, the retaining means is adapted to be integrated with a portion of the wall of the container. The retaining means may take a number of different configurations. For example, it can comprise a downwardly facing projection, such as a lug or hook. In such an embodiment, the downwardly extending projection is adapted to firmly integrate and interconnect with the plastic material forming that part of the side wall of the blown container adjacent the external flange.

The preform may be of any suitable shape for forming a container. In some cases, it is preferred that the body of the preform be wider than the external flange. This is particularly so for the manufacture of larger containers. It is preferred that the upper end of the handle include a support platform with a curved front face which is shaped to conform against the outer surface of the preform wall below the flange, and a flat top face which lies against the flat underside surface of the external flange.

The external flange on the preform should resist vertical (upwards) detachment of the handle and the upper end of the handle should be pressed against the underside of the external flange so to resist horizontal detachment. The method of the present invention enables one to produce a handled plastic bottle in which the upper end of the handle is fixedly connected to the blown container at a location immediately beneath the external flange. The other end of the handle does not need to be connected to the container and in such an embodiment, the depending gripping portion terminates at an unconnected free end.

In an alternative embodiment, the lower end of the handle may include lower retaining means also adapted to be integrated within a portion of the wall of the formed container. The handle and the preform may be positioned within the blow mould simultaneously and may be positioned in the mould by a single transfer arm which holds them both. The handle and preform do not need to be exactly positioned with the upper end of the handle in direct abutment with the underside of the external flange of the preform. There may be a small gap between the two. If there is a small gap between the two after they have been introduced into the open blow mould, this can be rectified after the blow mould has been closed. The blow mould may be shaped so to allow the preform to be moved downwardly from its original position within the blow mould by a distance of between about 1 to 4 mm so to push the preform so that there is direct abutment between the upper end of the handle and the underside face of external flange. Conveniently, the preform may be pushed down by the blow nozzle intended for use in introducing the high pressure gas into the preform to cause stretch blow moulding.

Alternatively, the preform and handle may be separately introduced into the open blow mould on separate transfer arms, each moving in a substantially horizontal plane. The handle may be inserted into the blow mould marginally earlier or later than the preform and the side wall of the preform and the upper end of the handle may be respectively shaped so that the preform may slide across the top of the handle when being positioned adjacent to the handle in the blow mould.

Most preforms used on the commercial stretch blow moulding of containers include a flange beneath the container neck finish. This flange (often referred to as the "support ledge") has many purposes including the mechanised transfer of the preform to and from a blow mould and the support of the preform within the blow mould during the introduction of high pressure gas to blow mould the container. Such preforms may be used in the method of the present invention.

Preferably, the upper end of the handle includes a support platform having a curved front face shaped to follow the geometry of the preform immediately beneath the external flange. Such a curved face assists in the positioning and location of the handle adjacent to the preform. Where a curved face is provided, the inner diameter of the curved face should match the outside diameter of the preform. The arc length of the face may vary but it is found that it is easier to insert the handle into conventional blow molding tools when the arc is relatively short (between 5 to 15°). However, in cases where the blow molding apparatus can accommodate a broader face it can be desirable for the arc length to be larger. As it is preferred that the handle and preform be brought together along a path substantially perpendicular to the longitudinal axis of the preform, the arc length of the curved face cannot be significantly greater than 180°. If the handle is made from a resilient plastics material the arms of the curved face can extend around an arc length of up to about 220°-the preform being capable of being pushed through the opening between the arms with the arms thereafter clipping around the preform body. This arrangement provides more secure attachment of the upper end of the handle to the container once blown and is preferred in cases where the lower end of the handle is not to be attached to the container.

In a particularly preferred embodiment the handle includes a support platform with a front face shaped to follow the geometry of the preform immediately beneath the flange and a retaining means is spaced below the support platform and extends toward the preform such that plastics material is molded about the retaining means to thereby lock the retaining means within the wall of the plastic container. The spacing between the support platform and retaining means will generally allow plastics material to pass between the retaining means and support platform adjacent the upper surface of the retaining means and the retaining means preferably increases in vertical dimension toward the preform. The retaining means may include coacting upper and lower tabs which vertically diverge and extend toward the preform to provide increasing dimensions. The molding of plastic material on opposite sides of the coacting tabs locks the handle with the container wall. The lower of the tabs preferably extends downward so that plastic is molded adjacent its outer side.

In the embodiment of the invention where the handle includes a curved face which follows the geometry of the preform the handle may also include a recessed portion adjacent to the curved face which comprises one or more ribs. In such arrangement, when the preform is blown the portion of the preform immediately adjacent the curved face will expand into the recessed portion but less so into those areas comprising ribbing. As a consequence, once the bottle is blown the ribs in the recessed portion will be located within small indentations on the container and the ribs and indentations will thus co-operate to resist rotational movement of the handle. Alternatively, or in addition, the blow mould may incorporate small cavities positioned to be adjacent the respective outside edges of the upper end of the handle so to form blow moulded lugs adjacent the respective edges of the handle at its upper end. Such blow moulded lugs will also co-operate to resist rotational movement of the handle. The lower retaining means of the handle is preferably a lug or protrusion extending from the lower end of the handle. It should be shaped so that on blow moulding of the preform expansion of the side wall will capture and secure the lug within the formed body of the container. It may be of various geometrical shapes. Most preferably, a lug which incorporates a hook or other extension is utilised so to encourage secure engagement with the body of the container.

The handle may be of any suitable configuration. In one embodiment of the invention, the container formed is blow moulded so to include a recess on one side suitable for accommodating the handle. Preferably, this recess includes a ledge onto which the bottom part of the handle may rest. In this configuration, it is preferred that the handle be generally "C" shaped in configuration with the upper and lower retaining means being at opposite ends. In a particularly preferred embodiment, the cross section of the handle is "U" shaped so to include terminal flanges and a connecting web. It is preferred that the terminal flanges face downwardly at the lower end of the handle so that a hollow is formed under the connecting web. In this embodiment, the lower retaining means may be a lug extending from the web. When configured in this way, blow moulding of the preform in the vicinity of the lug forms a container side wall which fills the hollow formed by the flanges underneath the connecting web and thus securely retains the lug in position.

The handle may also include reinforcing ribs. In the embodiment described above in which the handle has terminal flanges extending from a web so to create a hollow on the underside of the handle, it is preferred to strengthen the terminal flanges with ribbing, as this area is exposed to high forces exerted by the expanding side wall of the preform during the blow moulding process.

Preferably, the handle is formed by injection moulding. It is not necessary that it be made from the same material as the container and it may be formed from a plastic such as high density polyethylene, polypropylene, PET, recycled PET, glass reinforced PET or glass reinforced high density polyethylene. The handle may also be made from metals such as aluminium. The container and the handle are preferably made from the same material. Most preferably this is PET or recycled PET. The use of the same materials for both container and handle simplifies recycling of the combination.

The preform used in the present invention may be made from any stretch blow mouldable polymer. Preferably, it is formed from a PET homopolymer or copolymer (whether virgin or regrind) or is a multi-layer structure which may include layers consisting of one or more of PET, PEN, EVOH or other polymers used in multilayer technology.

In accordance with a further embodiment of the invention, there is provided a handled plastic container which includes a blow moulded plastic bottle which has an external flange proximate to its opening and a separate handle interconnected thereto, wherein said handle includes an upper end and a depending gripping portion, the said upper end of the handle being fixedly connected to the container being sandwiched between the underside of the external flange and a portion of the container side wall.

Preferably, the upper end of the handle includes a curved face shaped to follow the geometry of the preform immediately beneath the external flange. The curved face is provided In a still further alternative embodiment, the upper end of the handle has a diverging distal end which is spaced below the flange and integrated with an upper dome portion of the container.

These and other features of the present invention will be understood from the following detailed description and drawings.

DETAILED DESCRIPTION

Figure 1:
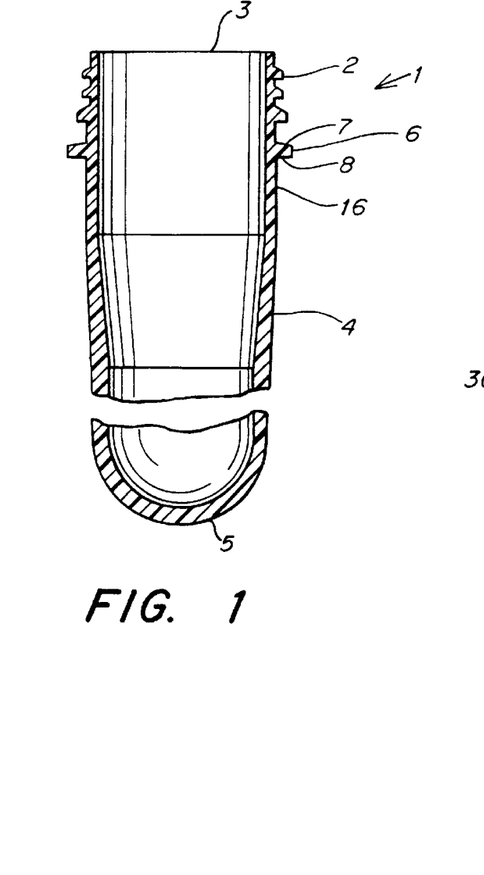
FIG. 1 is a fragmentary cross-sectional representation of a preform used in a preferred embodiment of the invention.

In FIG. 1 there is a preform generally designated by the numeral 1. It comprises a screw thread finish 2, an open end 3, elongated side wall portion 4, a closed end 5 and an external flange 6. It will be appreciated that the screw thread finish may be substituted by any other preformed finish known in the art. For example, the finish may be modified to accept a "clip-on" cap or other suitable closure.

The external flange 6 includes a top side 7 and an opposing underside face 8, both of which are substantially flat (planar). The preform shown in FIG. 1 is preferably injection molded and preferably formed from PET and recycled PET. If the preform is being formed using regrind material, it is preferred to utilize a three or five layer structure in which one or more regrind layers are encased within virgin material on either side as is known in the art. The configuration and composition of such multilayer preforms do not form any part of the present invention.

Figure 2:
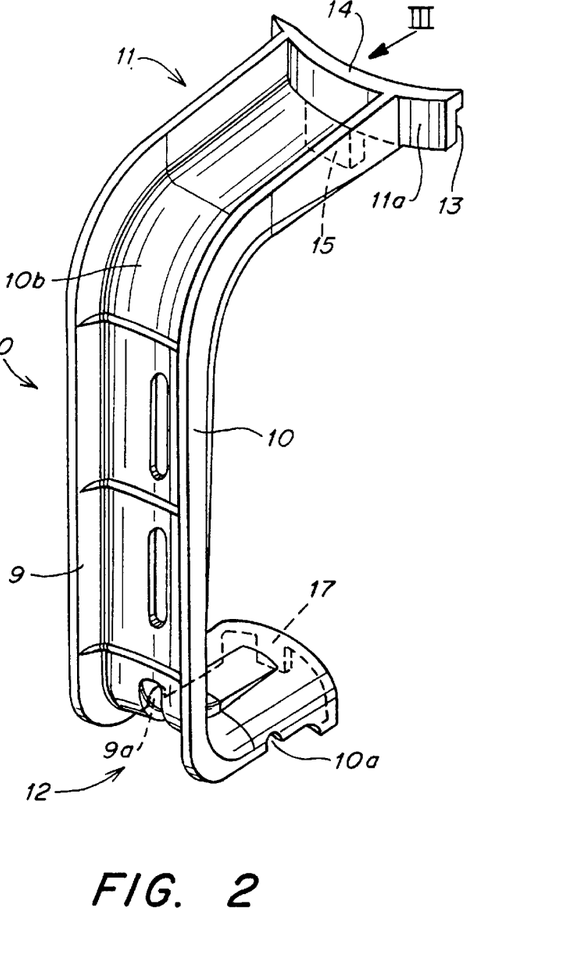
FIG. 2 is a perspective view of a handle suitable for use with the preform shown in FIG. 1.
Figure 3:
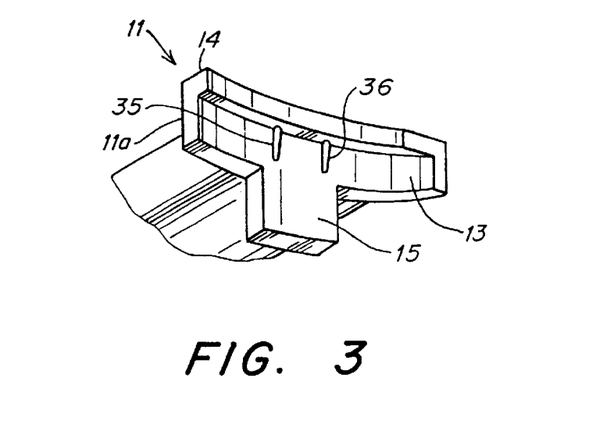
FIG. 3 is an enlarged perspective view of the area seen along Arrow III in FIG. 2.

In FIGS. 2 and 3, there is shown a first embodiment of a handle 30 suitable for use with the preform shown in FIG. 1 to form a handled container of the invention. The handle has upstanding flanges 9 and 10 which extend from the top of the handle 11 to the bottom of the handle 12. The flanges are interconnected by a web 10b which is slightly concave in profile. Flanges 9 and 10 are provided with indentations 9a and 10a on either side of the handle towards the lower end. At the upper end 11, there is provided a support platform 11a having a curved front face 13 and an upper abutment surface 14. The upper surface 14 is substantially flat and is adapted to conform to (lie alongside) the underside face 8 of external flange 6. The upper end 11 also includes a downwardly extending lug 15. The curved front surface 13 has a radius of curvature the same as that as the outer wall 4 of the preform 1 in the portion 16 located immediately beneath external flange 6. At the lower end 12 of the handle, there is provided lower retaining means being lug 17.

Figure 7:
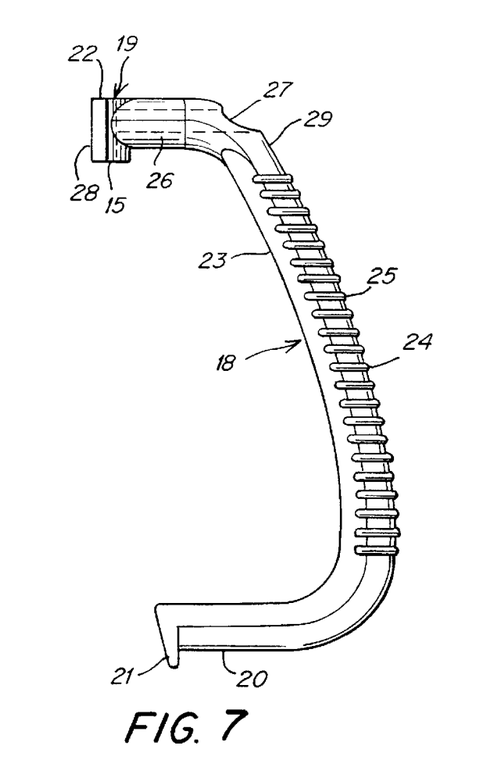
FIG. 7 is a side view of an alternative handle suitable for use in the present invention.
Figure 8:
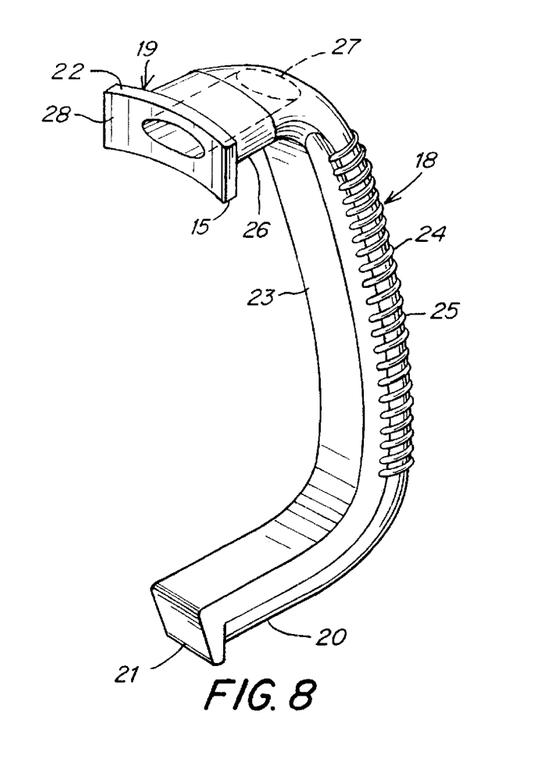
FIG. 8 is a front perspective view of the handle shown in FIG. 7.

In FIGS. 7 and 8, an alternative handle 18 has an upper support platform 19, with a curved front face 28 and a flat top surface 22. The handle has a lower end 20 which includes a projection 21 that is integrated into the side wall of the container when blown. Depending from the upper support platform 19 is a downwardly-extending lug 15 which is adapted to be integrated into the side wall of the container when blown immediately beneath the external flange 6. Handle 18 has a main body 23 which extends between the upper platform 19 and the lower end 20 and includes a plurality of cross ribs 24 and 25 to facilitate easy handling by the user and to aid grip. The upper platform 19 includes recessed portions 26 on either side and an opening 27 which extends all the way through the platform 19 from the front surface 28 to the rear (outer) face 29 of the upper handle.

A container made in accordance with the preferred embodiment of the invention is made in accordance with the following steps.

Figure 4:
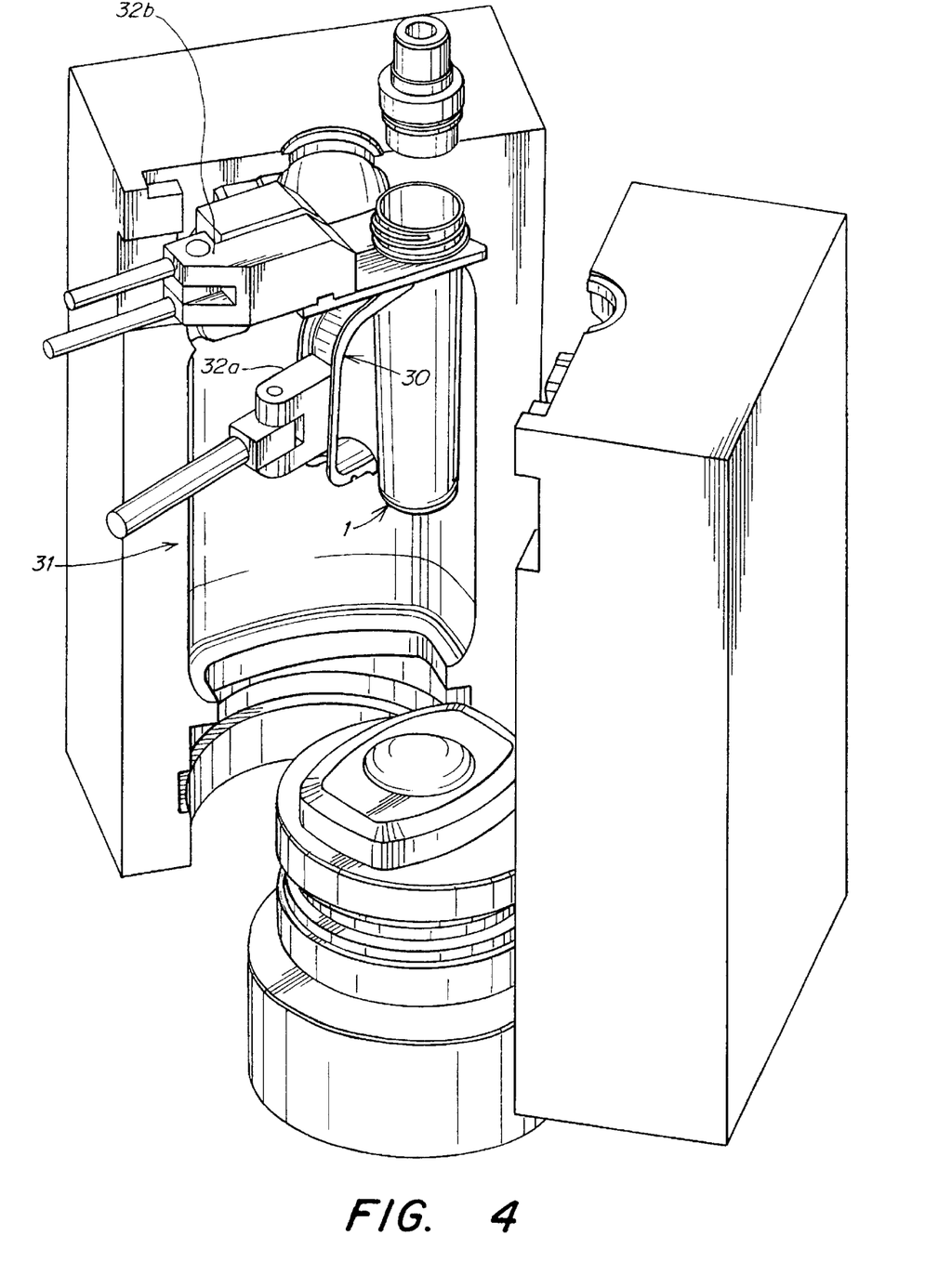
FIG. 4 is a perspective view of the handle and preform shown in FIG. 1 and 2 placed within an open blow mold.
Figure 5:
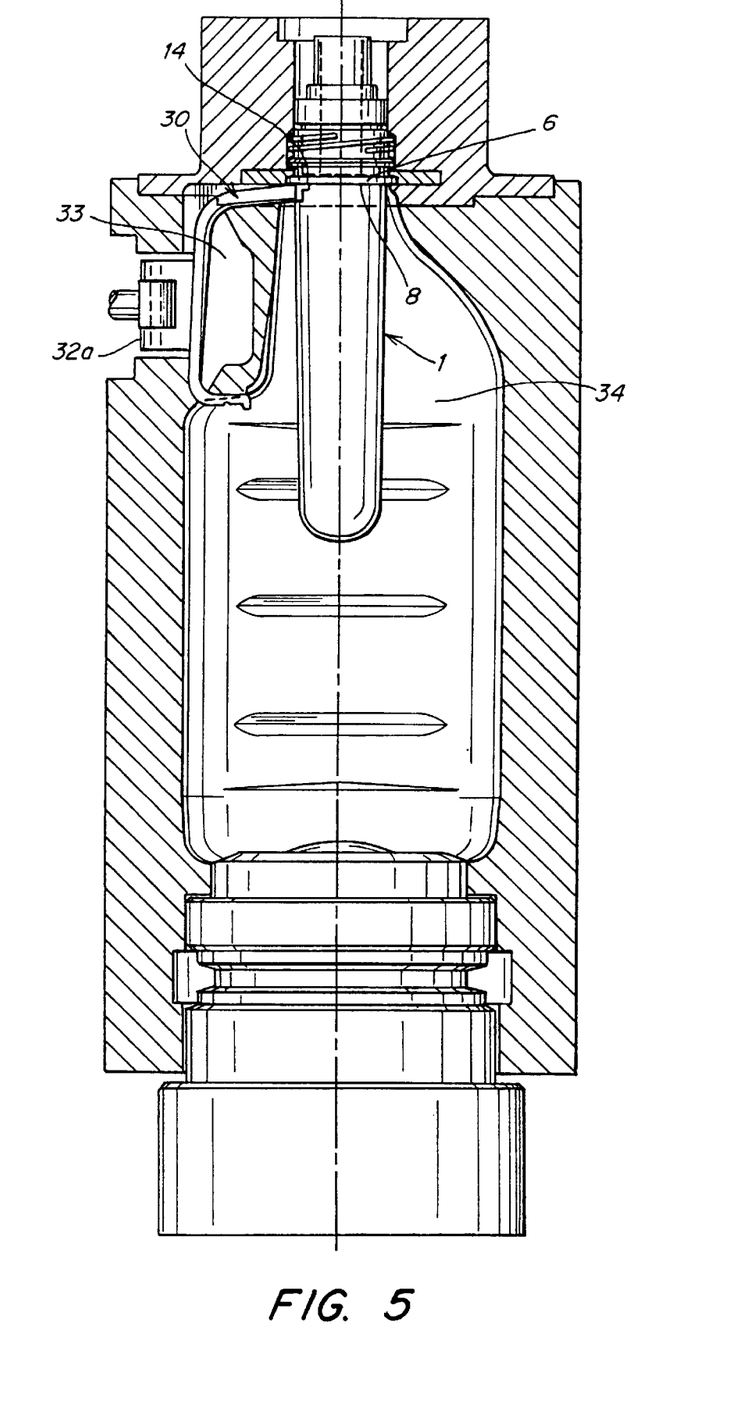
FIG. 5 is a cross sectional view of the blow mold shown in FIG. 4 with the preform and handle positioned therein with the blow mold closed.

First, the preformed plastic handle 30 shown in FIG. 4 is transferred to an open blow mold 31 by a transfer arm 32a as shown in FIG. 4. The preform shown in FIG. 1 is preheated in accordance with standard methodology. It is thereafter transferred to the blow mold 31 by transfer arm 32b. The preform 1 and handle 30 are transferred into the blow mold substantially simultaneously and in the same plane. The handle 30 fits within cavity 33 (as shown in FIG. 5) and the preform 1 within cavity 34. In another embodiment not shown, a single transfer arm may be used to transfer both the preform and the handle into the blow mold. In this embodiment, which is particularly suited to the type of handle shown in FIGS. 7 and 8, there may be provided a pin on the transfer arm which locates in opening 27 and jaws which press into recessed portions 26. The pin and jaws are located in a region below the part of the transfer arm which holds preform 1. As shown in FIG. 5, preform 1 and handle 30 are located adjacent to one another with abutment surface 14 in close proximity to the underside face 8 of external flange 6. Upon closing of the mold halves, the recessed portions in the mold (not shown) may hold the handle and the transfer arm may be retracted. FIG. 5 illustrates preform 1 and handle 30 positioned within the closed blow mold.

Once the blow mold has been closed, a gas is introduced into the preform so to stretch and blow the preform beneath external flange 6. In the blow molding process, plastic underneath the flange 6 expands around the sides of the upper support platform (11a in FIG. 2; 19 in FIG. 7) and incorporates lug 15 into the side wall of the container. The plastic underneath the flange expands and this pushes the top flat surface (14 or 22) hard up against the underside surface 8 of external flange 6. The upper platform is thereby sandwiched between the underside face 8 of flange 6 and the upper blown wall portion so to securely hold it in position. Lug 15 restricts lateral movement. The plastic also expands around the sides of the upper support platform and this restricts the sideways movement of the handle once the container has been blown. The sideways movement is further restricted by ribs 35 and 36 (see FIG. 3) and corresponding indentations in the blown container.

At the lower end of handle 30, the lug (17 in FIG. 2; 21 in FIG. 7) becomes surrounded by plastic which expands upwardly to fill the recess between the handle side flanges (9 and 10 in FIG. 2). The retaining lug surrounded by the plastic resists sideways or horizontal movement.

Figure 6:
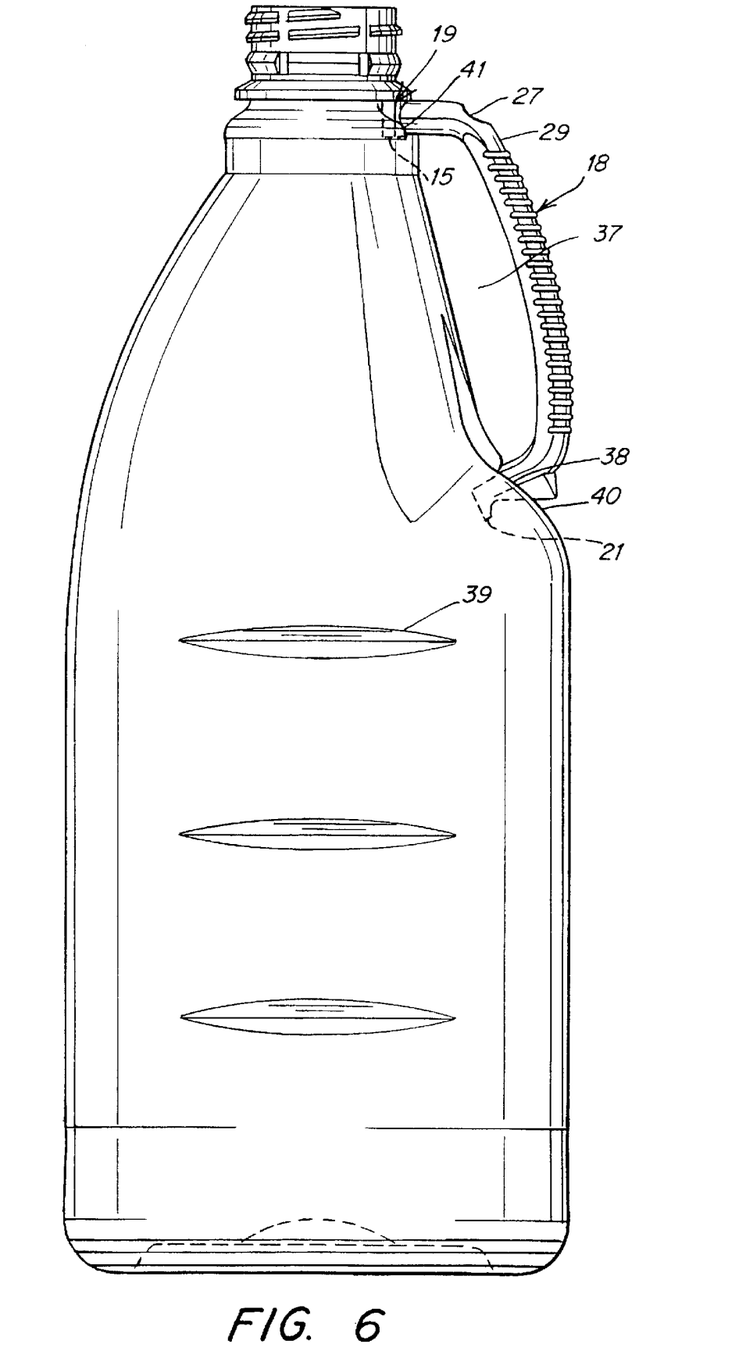
FIG. 6 is a side view of a handled bottle made in accordance with an alternative embodiment of the invention.

The container formed using the handle illustrated in FIGS. 7 and 8 is shown in FIG. 6. It is noted that the handle 18 is designed so that it fits within the overall width/depth of the bottle. This facilitates easy package and transport of the container in that the handle will not interfere with cartons and boxes.

Figure 9:
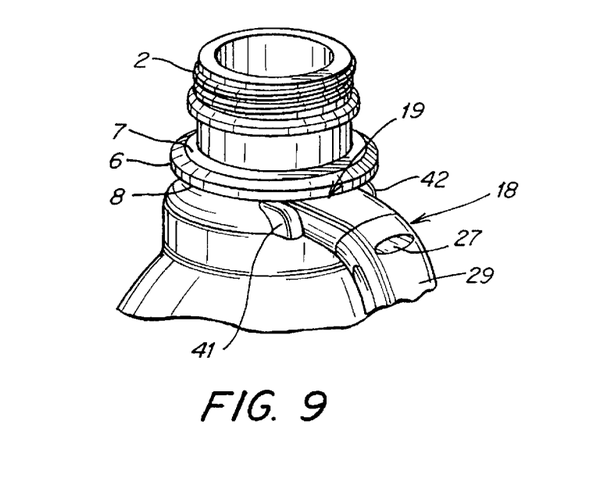
FIG. 9 is a perspective view of the top section of the handled container shown in FIG. 6.

The container shown in FIG. 6 has a recess 37 which includes a ledge 38 on which the lower portion 20 of handle 18 sits. The container preferably includes side wall ribbing 39 to strengthen the walls against crushing. The top of this container is shown in FIG. 9. Portions 41 and 42 are blown around the opposing sides of upper platform 19 to further resist rotational movement of the handle.

Once liquid has been removed from the container, the container may be crushed at point 40 shown in FIG. 6. This facilitates easy removal of the handle from the container as a whole. This easy removal is useful in recycling. If the handle is formed from a different material to the bottle, then contamination can be minimized. If the handle is made from the same material as the bottle, removal may still be desirable as different processing is often required in recycling thicker and harder materials as would preferably be used in a handle as compared with the thin and flexible blown container.

Figure 10:
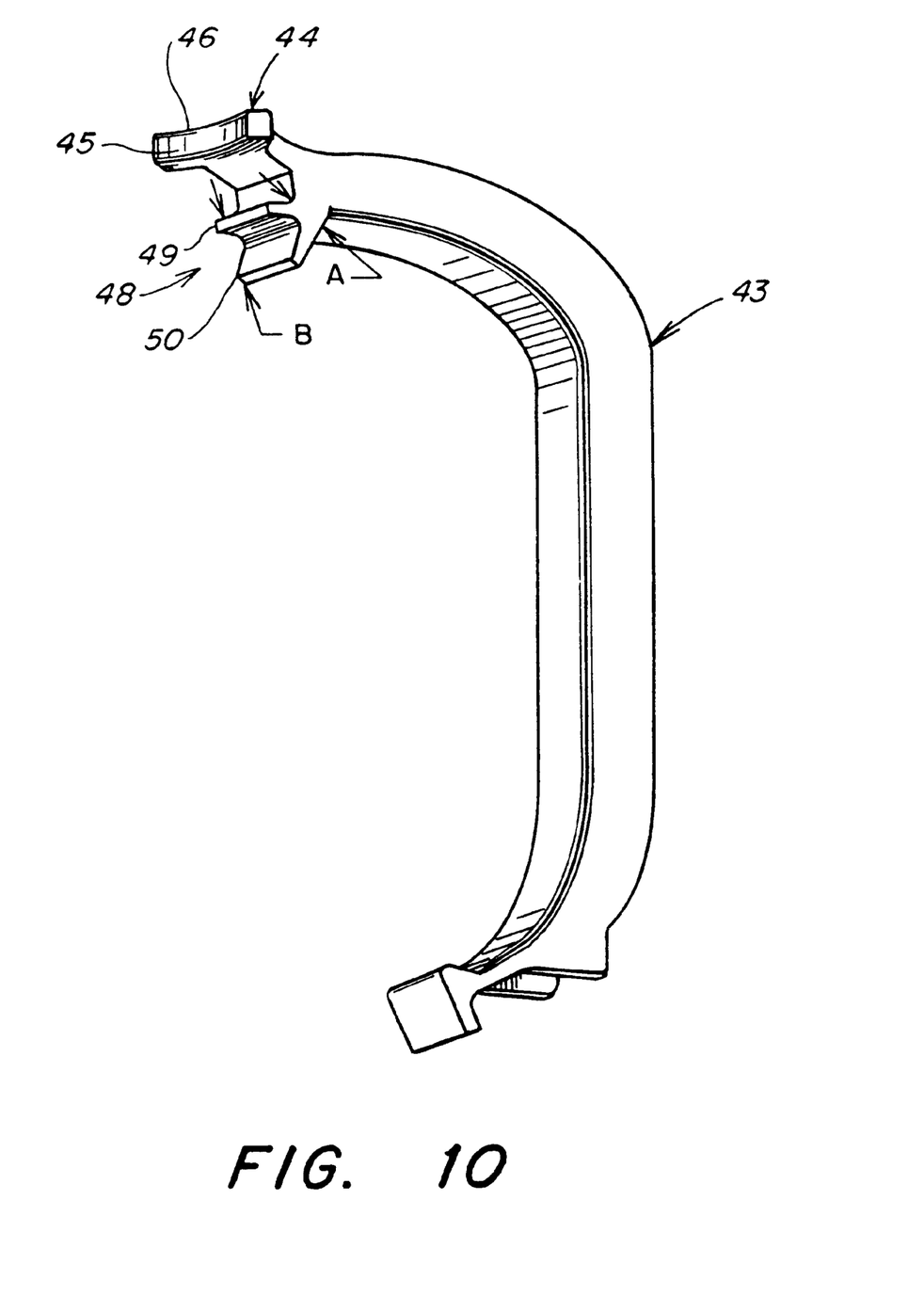
FIG. 10 is a perspective view of a further alternative handle for use in the present invention.
Figure 11:
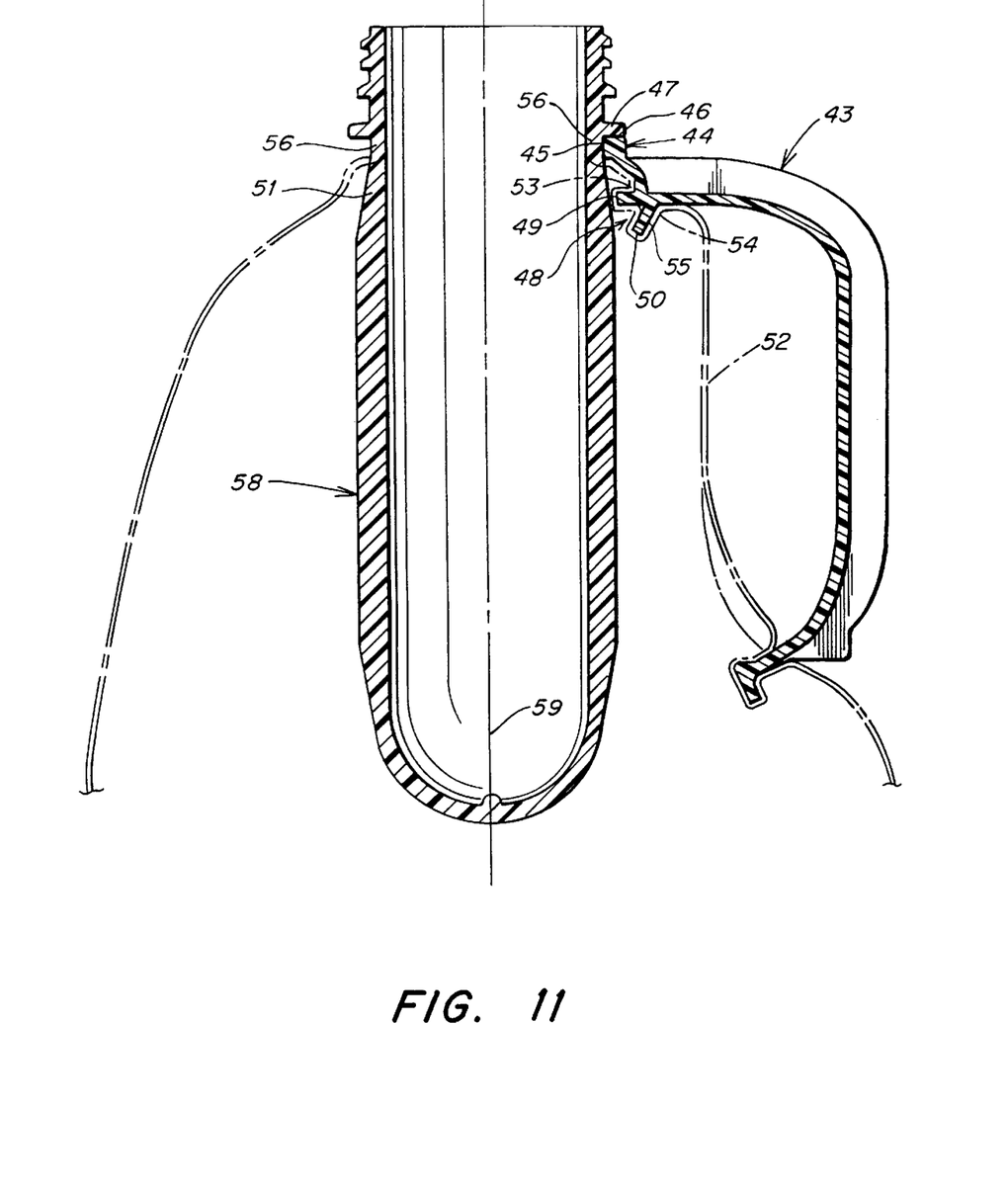
FIG. 11 is a cross-sectional view of the further alternative handle of FIG. 10 positioned with respect to the preform, and substantially blown container.

FIGS. 10 and 11 show a preferred embodiment in which the handle 43 has an upper end with a support platform 44 which includes a top flat surface 46, and a curved front surface 45 having a radius of curvature the same as the outer wall of the preform in the portion located immediately below the external flange 47. A retaining means 48 is provided which is spaced beneath the support platform and includes a pair of vertically divergent tabs, upper tab 49, lower tab 50 extending toward the preform (i.e., toward the longitudinal axis 59 of the preform). The tabs diverge toward their distal ends (which lie adjacent the preform wall) so that a dimension of the retaining means 48 in the vertical plane shown in FIG. 11 increases toward bottle preform 58. In FIG. 10, two sets of arrows, A at the narrow point (juncture with the handle), and B at the widest point (toward the preform), show this divergence.

The preform 58 is blow molded within a mold in accordance with the general procedure described with respect to FIG. 4. Blow molding of the preform 58 causes the plastics material of a portion of the preform wall 51 to be molded about the retaining means 48 as shown in FIG. 11 so that a portion of the retaining means of increasing dimension is locked within the resulting container wall 52 with the top face 46 at the upper end of the handle 44 abutting the underside of the flange 47. The upper part of the handle is thereby retained during lifting by opposing portions 53, 54 of the container wall 52 on opposite sides of the tabs 49, 50 and the abutment of the top face 46 of the handle 43 on the underside of the flange 47.

The lower tab 50 preferably extends downward and plastics material of the molded bottle is provided adjacent the outer side of the lower tab 55.

The preform 58 may include a cylindrical wall portion 56 immediately below the flange 47 for receiving the support platform 44 and a portion 51 increasing in wall thickness below said cylindrical portion adjacent which the tabs 49, 50 extend.

FIGS. 12–15 show another preferred embodiment in which the handle 60 has an upper support platform 61 which includes a flat upper surface 66, and a front face 62 having a radius of curvature the same as the outer wall of the preform in the portion located immediately below the external flange. A retaining means 63 is provided which is spaced beneath the support platform 61 by a wall portion 64. The retaining means includes a downwardly extending tab 65 which extends toward the preform.

Figure 12:
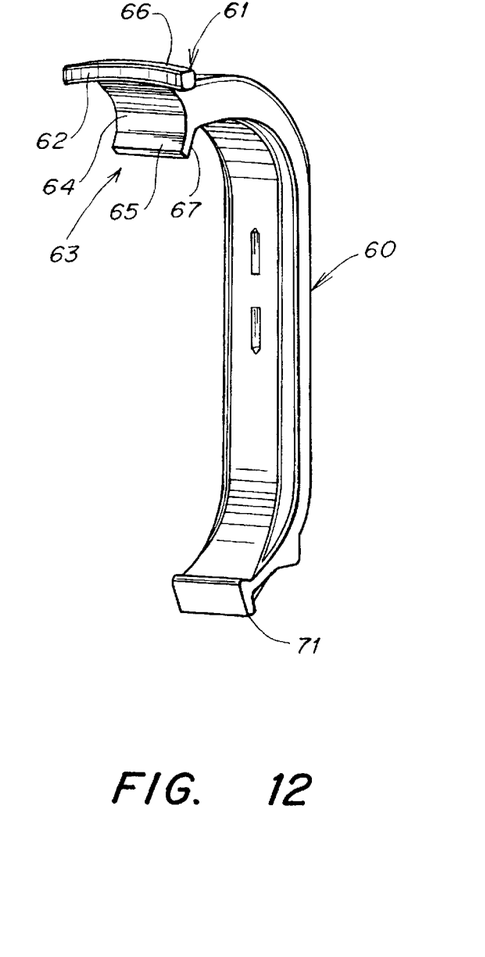
FIG. 12 is a front perspective view of a further alternative handle for use in the present invention.
Figure 13:
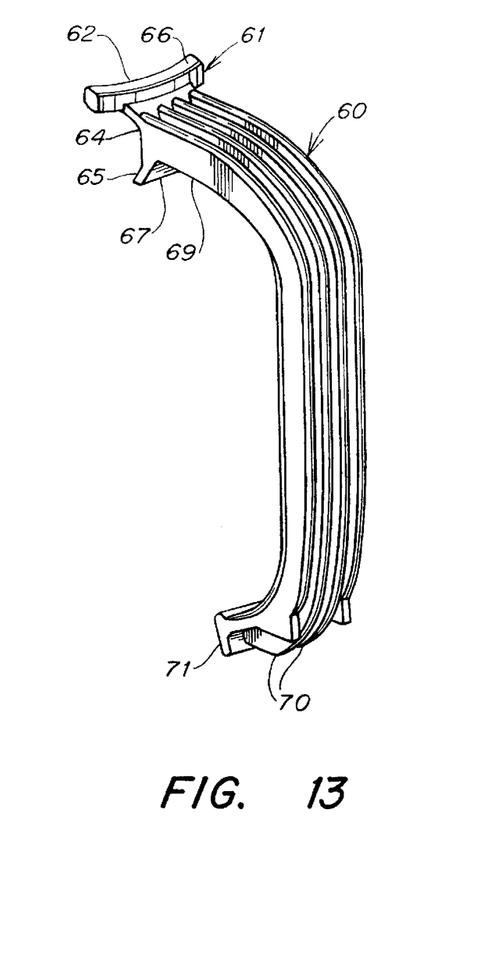
FIG. 13 is a rear perspective view of the handle of FIG. 12.
Figure 14:
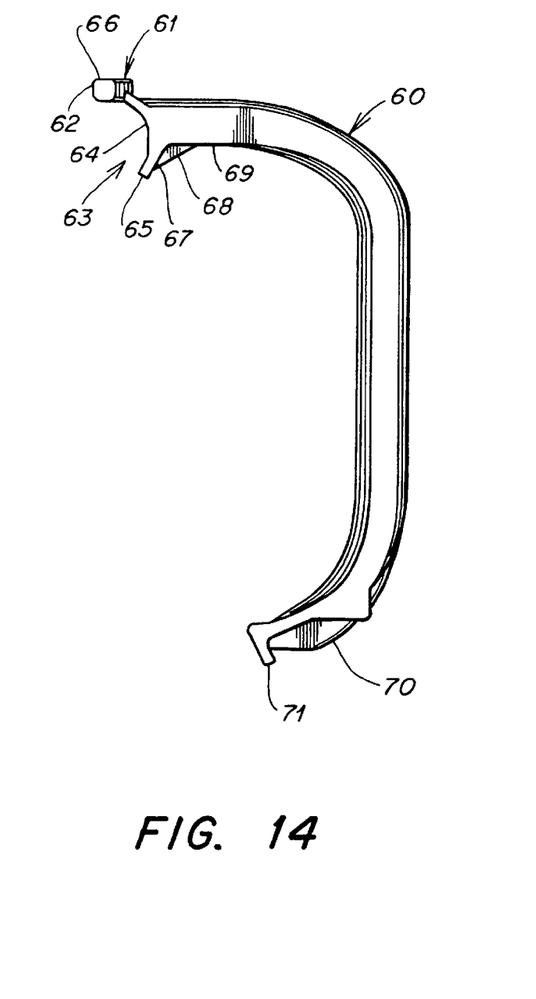
FIG. 14 is a side view of the handle of FIG. 12.
Figure 15:
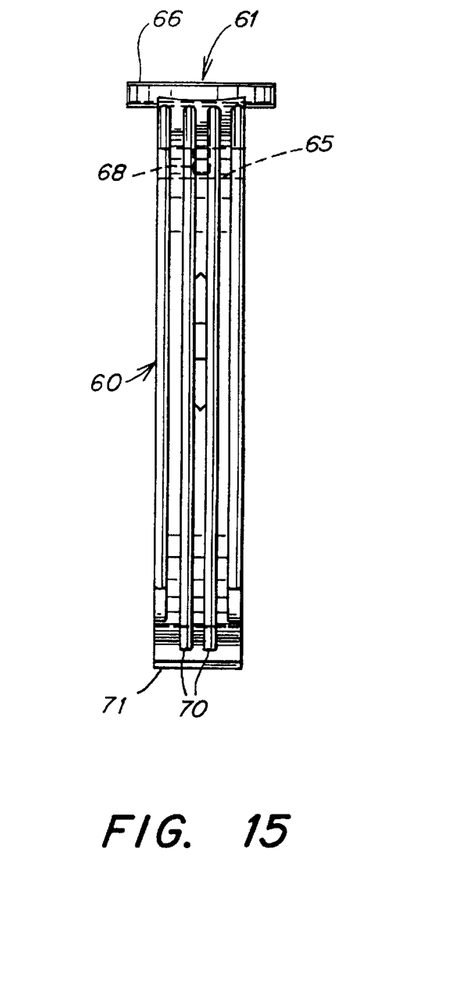
FIG. 15 is an exterior (rear) view of the handle of FIG. 12.

The preform is blow-molded within a mold in accordance with the general procedure described with respect to FIG. 4. Blow-molding of the preform causes the plastics material in a portion of the preform wall to be molded about the retaining means 63. The upper part of the handle is thereby retained during lifting by opposing portions of the container wall on opposite sides of the tab 65 and the abutment of the flat upper surface 66 of the handle on the flat underside of the flange.

The lower tab 65 preferably extends generally downward and plastics material of the molded bottle is provided adjacent the outer side 67 of the lower tab. The lower tab is preferably reinforced by a substantially vertical rib 68 which engages the outer surface 67 of the tab and the lower surface 69 of the adjacent handled portion. Similar reinforcing ribs 70 are provided on the outer surface of a downwardly extending tab 71 on the lower end of the handle.

In this embodiment, as in the embodiment of FIGS. 10–11, the outer surface of the handle has vertically extending ribs between the outer flanges on the handle, which further strengthen the handle.

The above embodiment provides a container which is easy to use, simple to dismantle after emptying for recycling and which can be readily manufactured from a preform on blow mold apparatus at a relatively rapid rate.

Figure 16:
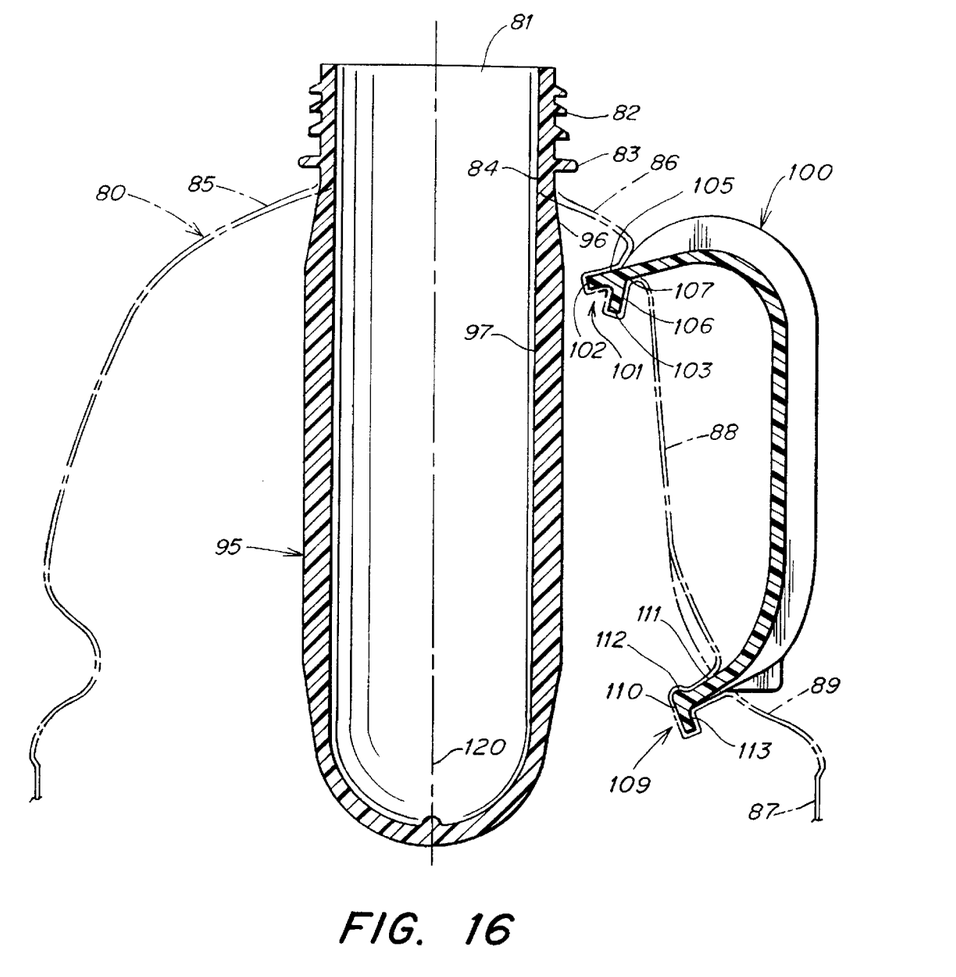
FIG. 16 is a cross-sectional view of a further alternative handle and container, with FIGS. 17 and 18 showing in greater detail the upper and lower handle attachment portions respectively.
Figure 17:
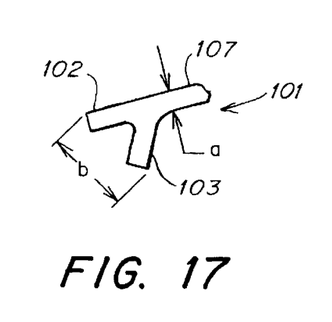
Figure 18:
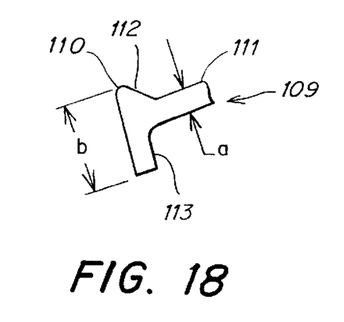

FIGS. 16–18 show another preferred embodiment, similar to the embodiment of FIGS. 10–11 in utilizing a pair of divergent tabs as the upper handle attachment means, but eliminating the platform which sits along the preform flange. Here the upper handle attachment is spaced below the preform/bottle flange and surrounded by an upper portion of the blown container dome (shoulder). This is particularly useful for polyester containers used at elevated temperatures, such as hot-fill containers, because this embodiment enables a higher degree of biaxial orientation (and therefore higher thermal stability) in the upper dome portion of the container. This increase in biaxial orientation not only improves the thermal stability at the upper end of the dome portion, but also increases the mechanical strength of this portion to enable secure attachment of the upper end of the handle.

More specifically, a PET container 80 has an open top end 81 with a threaded finish 82 and flange 83. Below the flange there is an unstretched cylindrical portion 84 (by which the preform/container is supported below the flange during transport, filling, capping, etc.) and then a dome portion 85 having a relatively high degree of biaxial orientation at its upper end 86 adjacent the cylindrical portion and flange. The container is stretch blow molded from a preform 95 similar to the preform in the prior embodiments, including the cylindrical portion 84 below the flange 83, an outwardly-flaring tapered portion 96 which forms the dome, and a substantially cylindrical sidewall 97 which forms the main panel section 87 of the container. In this embodiment, the handle 100 is attached to the dome 85 of the container, above the panel section 87. A recess 88 is formed in the dome, providing a space for the fingers to be inserted through the handle. The handle 100 includes an upper attachment end 101 having a pair of vertically divergent tabs extending toward the preform (i.e., towards a longitudinal axis 120 of the preform), including an upper tab 102 and a lower tab 103. The upper tapered portion 96 of the preform is blow-molded about the tabs as shown, such that the blown container dome 85 surrounds the outer sides 105, 106 of the tabs and engages the narrow portion 107 of the upper handle attachment. The area 86 of the container dome above the upper handle attachment preferably has an average planar (biaxial) stretch ratio of greater than 2.5, to provide the enhanced thermal and mechanical strength as previously described. The upper handle attachment portion 101 is located in close proximity, e.g., about ½ inch, below the bottom of the flange.

As illustrated in FIG. 17, the diverging tabs 102, 103 have a widest distal point defined by a width b, and a narrow proximal point 107 defined by a width a. This anchoring ratio b/a is preferably in the range of about 2–4, and more preferably about 3. In addition, the upper attachment portion may also diverge (become wider) going from top to bottom in order to further secure the upper handle to the dome.

At the lower end of the handle, a lower attachment means 109 is provided which is incorporated into a lower portion 89 of the dome by blow molding the preform around the lower handle attachment portion. As shown in FIGS. 16 and 18, this lower handle portion is similar to the upper handle attachment portion in having a diverging distal end 110 defined by a width b, and a narrow proximal end 111 defined by a width a. Again, the preform is blown around the outer sides 112, 113 of the diverging end, in order to secure the handle to the container. An anchoring ratio b/a as described for the upper handle attachment portion above is preferably used. Alternatively, the lower handle attaching portion may be similar to the upper handle attaching portion (i.e., diverging tabs).

It will be appreciated that various modifications and additions may be made to the method, preform, the handle and the container as hereinbefore described without departing from the scope of the present invention.

What is claimed is:

1. A method of manufacturing a handled plastic container which includes the steps of:

(a) positioning a preformed handle and a synthetic resin preform within an open blow mold, said preform including an external flange having a substantially flat underside face and said handle having an upper end with a substantially flat upper abutment surface;

(b) closing the blow mold and stretch blow molding the preform beneath the flange to form a container, wherein a sidewall portion of the preform is expanded so as to sandwich the upper end of the handle between a portion of the sidewall of the formed container and the flange with the substantially flat upper abutment surface and underside face being pressed together so as to fixedly connect the handle to the blown container.

2. The method of claim 1, wherein the upper end of the handle further includes a downwardly extending projection and the sidewall of the preform is expanded to surround the projection.

3. The method of claim 1, wherein the preform and handle are brought together into position where the upper abutment surface of the handle is adjacent to the underside face of the flange by relative movement of the preform and handle towards each other along a first path which is substantially perpendicular to a longitudinal axis of the preform.

4. The method of claim 3, wherein the preform and handle are brought together prior to their introduction into the blow mold, and once brought together are introduced into the blow mold together along a second path which is substantially perpendicular to the longitudinal axis of the preform.

5. The method of claim 4, wherein the first and second paths are substantially in the same plane.

6. The method of claim 1, wherein prior to entering the mold the preform is heated to an elevated temperature to enable stretch blow molding of the preform, and the handle is unheated.

7. The method of claim 1, wherein the upper end of the handle has a support platform with a curved front face which conforms to the outer surface of the preform below the flange and a top face which comprises the flat upper abutment surface.

8. The method of claim 7, wherein the upper end of the handle includes a lower retaining means spaced below the support platform and extending toward the preform such that the sidewall of the preform is expanded into the space between the retaining means and support platform and around the retaining means.

9. The method of claim 8, wherein the retaining means includes upper and lower tabs which diverge and extend towards the preform, and the sidewall of the preform is expanded around the tabs.

10. The method of claim 9, wherein the retaining means is a downwardly extending tab and the sidewall of the preform is expanded around the tab.

11. The method of claim 10, wherein the downwardly extending tab has a rear surface, facing away from the preform, with a supporting rib engaging the rear surface of the tab.

12. The method of claim 11, wherein the lower end of the handle has a downwardly extending tab with a rear surface facing away from the preform, and a supporting rib engaging the rear surface of the tab.

13. A handled plastic container comprising a blow molded plastic container and a separate handle interconnected thereto, wherein the container includes a neck including a preform finish and beneath said finish an outwardly extending flange, the flange having a substantially flat underside face, and the handle having an upper end with an upper support platform having a curved front face, a substantially flat upper abutment surface and opposing sides, the upper support platform being sandwiched between a portion of the sidewall of the formed container and the flange with the substantially flat upper abutment surface of the handle lying along the underside face of the flange and the container sidewall portion being expanded around the sides of the upper support platform.

14. The container of claim 13, wherein the handle includes a lower end which is integrated with a portion of the sidewall of the container.

15. The container of claim 13, wherein the upper end of the handle further includes a downwardly extending projection and the container sidewall portion being expanded to surround the projection.

16. The container of claim 13, wherein the upper support platform is curved and has an arc length of no greater than 220°.

17. The container of claim 16, wherein the upper support platform has an arc length of no greater than 15°.

18. The container of claim 16, wherein the upper support platform has an arc length of from 5 to 15°.

19. A handled plastic container comprising a blow molded plastic container made from a preform and a separate handle interconnected thereto, wherein the container includes a neck including a preform finish and beneath said finish an outwardly extending flange, the flange having a substantially flat underside face, and the handle having an upper end with an upper support platform having a curved front face, a substantially flat upper abutment surface and opposing sides, the upper support platform being sandwiched between a portion of the sidewall of the formed container and the flange with the substantially flat upper abutment surface of the handle lying along the underside face of the flange, wherein the upper end of the handle includes a lower retaining means spaced below the upper support platform and extending toward the preform such that a sidewall of the preform is expanded into the space between the retaining means and upper support platform and around the lower retaining means.

20. The container of claim 19, wherein the retaining means includes upper and lower tabs which diverge and extend towards the preform, and the sidewall of the preform is expanded around the tabs.

21. The container of claim 19, wherein the retaining means is a downwardly extending tab and the sidewall of the preform is expanded around the tab.

22. The container of claim 21, wherein the downwardly extending tab has a rear surface, facing away from the preform, with a supporting rib engaging the rear surface of the tab.

23. The container of claim 22, wherein the lower end of the handle has a downwardly extending tab with a rear surface facing away from the preform, and a supporting rib engaging the rear surface of the tab.

24. The container of claim 19, wherein the upper support platform has opposing sides and the container sidewall portion is expanded around the sides of the upper support platform.

25. The container of claim 19, wherein the upper support platform is curved and has an arc length of no greater than 220°.

26. A handled plastic container comprising a blow-molded plastic container and a separate handle interconnected thereto, wherein the container includes a neck including a preform finish and beneath said finish an outwardly extending flange, the container further including an unstretched cylindrical portion below the flange, a biaxially stretched and oriented dome below the cylindrical portion, and below the dome a biaxially stretched and oriented cylindrical panel portion, the handle having an upper attachment portion integrated with an upper portion of the dome and including a diverging distal end and a narrower proximal end, the dome being expanded around the diverging end and into contact with the narrower end in order to secure the upper handle attachment to the container, the area of the dome above the upper attachment portion having an average planar stretch ratio of greater than 2.5 and the handle having a lower attachment portion integrated with a lower portion of the dome.

27. The container of claim 26, wherein the upper attachment portion includes upper and lower tabs.

28. The container of claim 26, wherein the lower attachment portion includes a diverging distal end and narrower proximal end.

29. The container of claim 26, wherein the upper attachment portion has an anchoring ratio b/a in a range of about 2 to 4, where b is the width of the diverging distal end and a is the width of the narrower proximal end.

* * * * *

UNITED STATES PATENT AND TRADEMARK OFFICE
CERTIFICATE OF CORRECTION

PATENT NO.   : 6,444,158 B1
DATED        : September 3, 2002
INVENTOR(S)  : Grob et al.

It is certified that error appears in the above-identified patent and that said Letters Patent is hereby corrected as shown below:

Column 12,
Lines 29 and 30, after "wherein" delete "the upper support platform has opposing sides and".

Signed and Sealed this

Fifteenth Day of April, 2003

JAMES E. ROGAN
*Director of the United States Patent and Trademark Office*